United States Patent [19]
Cox

[11] Patent Number: 6,036,750
[45] Date of Patent: Mar. 14, 2000

[54] SEPARATOR WITH ROTATING FILTER

[75] Inventor: Donald G. Cox, Bargersville, Ind.

[73] Assignee: Air Equipment & Engineering, Inc., Martinsville, Ind.

[21] Appl. No.: 09/059,357

[22] Filed: Apr. 13, 1998

[51] Int. Cl.[7] .................................................. B01D 21/26
[52] U.S. Cl. ................ 95/269; 95/270; 95/273; 95/277; 95/282; 55/424; 55/425; 55/426
[58] Field of Search ........................... 95/277, 273, 280, 95/271, 282, 269, 270; 96/400, 425; 55/424, 425, 426, 400, 337

[56] References Cited

U.S. PATENT DOCUMENTS

| | | | |
|---|---|---|---|
| 3,525,198 | 8/1970 | Neitzel | 96/425 |
| 3,628,313 | 12/1971 | Broadbent | 55/400 |
| 4,090,857 | 5/1978 | Ferri et al. | 55/337 |
| 4,226,715 | 10/1980 | Niederer et al. | 96/400 |
| 5,217,512 | 6/1993 | Williams | 96/425 |

*Primary Examiner*—David A. Simmons
*Assistant Examiner*—Minh-Chau T. Pham
*Attorney, Agent, or Firm*—Woodard, Emhardt, Naughton, Moriarty & McNett Patent and Trademark Attorneys

[57] ABSTRACT

A secondary separator stage for separating material conveyed in a fluid stream. A material collecting receptacle includes an inlet conduit and an exhaust vent. The stream of fluid with materials flow via the inlet conduit into the receptacle. An exhauster located upstream on the inlet conduit removes the majority of the fluid within the fluid stream prior to the stream flowing into the receptacle. The remaining portion of the fluid entering the receptacle is removed via an exhaust vent. A rotating plate allows the fluid in the receptacle to pass therethrough but blocks passage of any conveyed materials.

18 Claims, 3 Drawing Sheets

6,036,750

SEPARATOR WITH ROTATING FILTER

BACKGROUND OF THE INVENTION

1. Field of the Invention

This invention is in the field of devices for separating conveyed materials in a fluid stream.

2. Description of the Prior Art

A variety of manufacturing systems result in various particles which must be conveyed away from the plant floor. These include particles of dust, metal, plastics, wood and paper. It is the custom to introduce the materials into an air stream which is then routed via conduits to various separators and collectors. In non manufacturing facilities there is also a need for conveying lightweight materials over large distances. Air streams and other fluid streams are utilized to convey the various materials. Eventually, the fluid or air is removed from the stream and the conveyed materials are collected in a receptacle.

It is the practice to use large cyclone exhausters for conveying the materials over large distances. The exhausters are located outside of the building or may extend through the roof of the building. Various environmental regulations restrict the use and construction of such exhaust systems. Disclosed herein is a more compact device for separating the foreign materials from the conveyed stream. The compactness is achieved through the primary removal of most of the fluid from the stream prior to the stream emptying into a receptacle for collection of the material. A secondary exhaust then removes the remaining fluid. In the event a stationary filter is placed over the secondary exhaust, the filter quickly becomes clogged blocking total passage of fluid or air therethrough. A rotating filter prevents the foreign material from escaping out through the secondary exhaust while preventing the material from blocking the air or fluid flow.

SUMMARY OF THE INVENTION

One embodiment of the present invention is a secondary separator stage for separating material conveyed in a fluid stream comprising an inlet conduit through which the fluid stream with conveyed materials flows into a receptacle connected to the conduit to receive the materials conveyed in the stream and at least a portion of fluid in the stream. The receptacle has a secondary exhaust vent with a portion of fluid exiting the receptacle via the vent. A rotating screen is mounted in the receptacle and deflects materials in the receptacle from flowing out the vent while allowing a portion of the fluid to flow out the vent.

A further embodiment of the present invention is a method of separating materials conveyed in a stream of air comprising the steps of conveying the materials in a stream of air, directing the stream with materials into a material collecting receptacle, exhausting some of the air within the receptacle via a receptacle vent, and rotating a screen to block passage of materials within the receptacle from flowing out the vent while allowing flow of some of the air within the receptacle through the screen and out the vent.

It is an object of the present invention to provide a new and improved device and method for separating and collecting material from a fluid stream.

An additional object of the present invention is to provide a secondary separator stage of compact and small construction.

A further object of the present invention is to provide a method for separating materials conveyed in a stream of air through the use of multiple exhaust venting and a rotating filter limiting escape of the foreign material.

Related object and advantages of the present invention will be apparent from the following description.

DESCRIPTION OF THE PREFERRED EMBODIMENT

Figure 1:
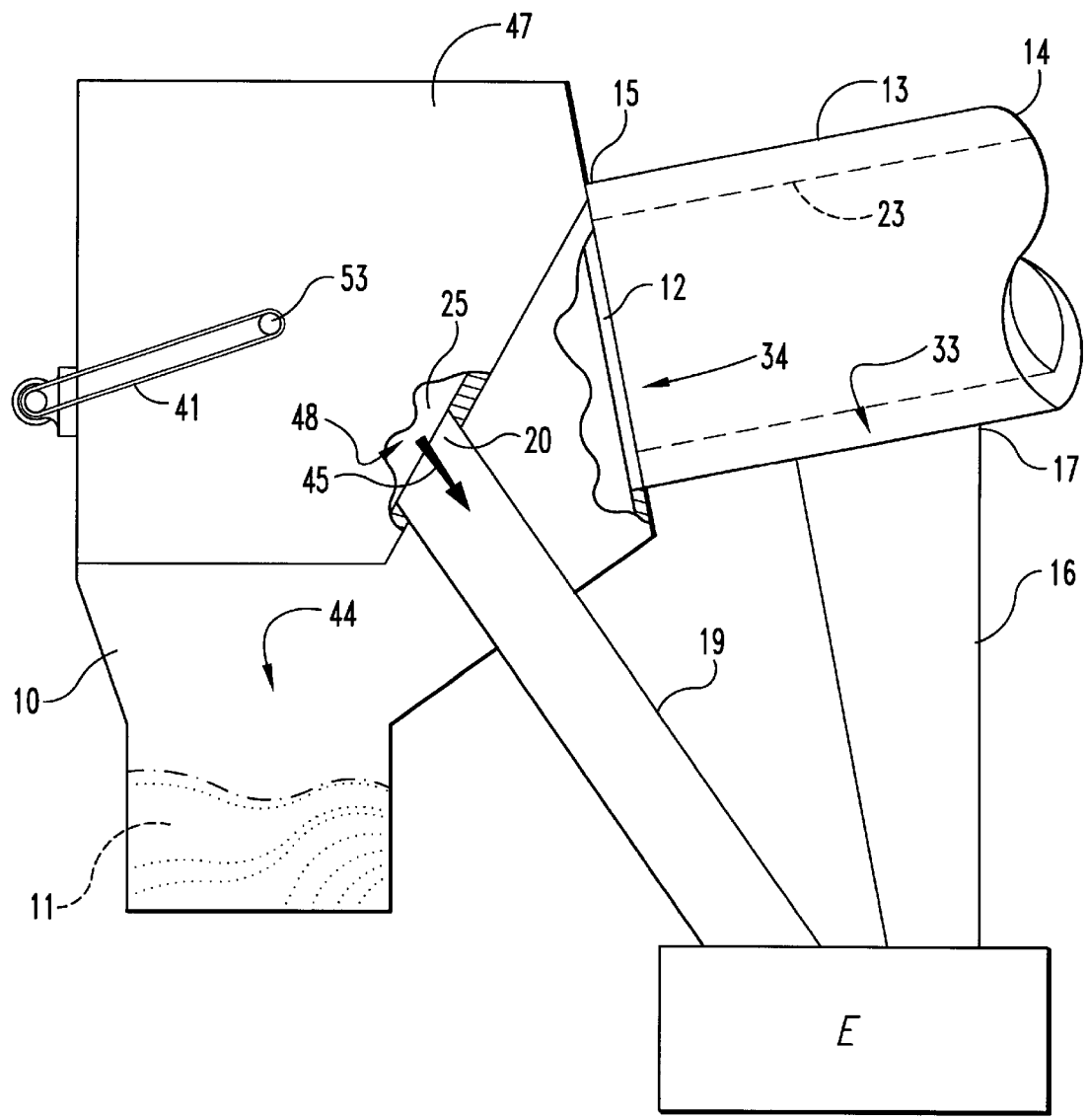
FIG. 1 is a fragmentary side view of a separator incorporating the present invention.
Figure 2:
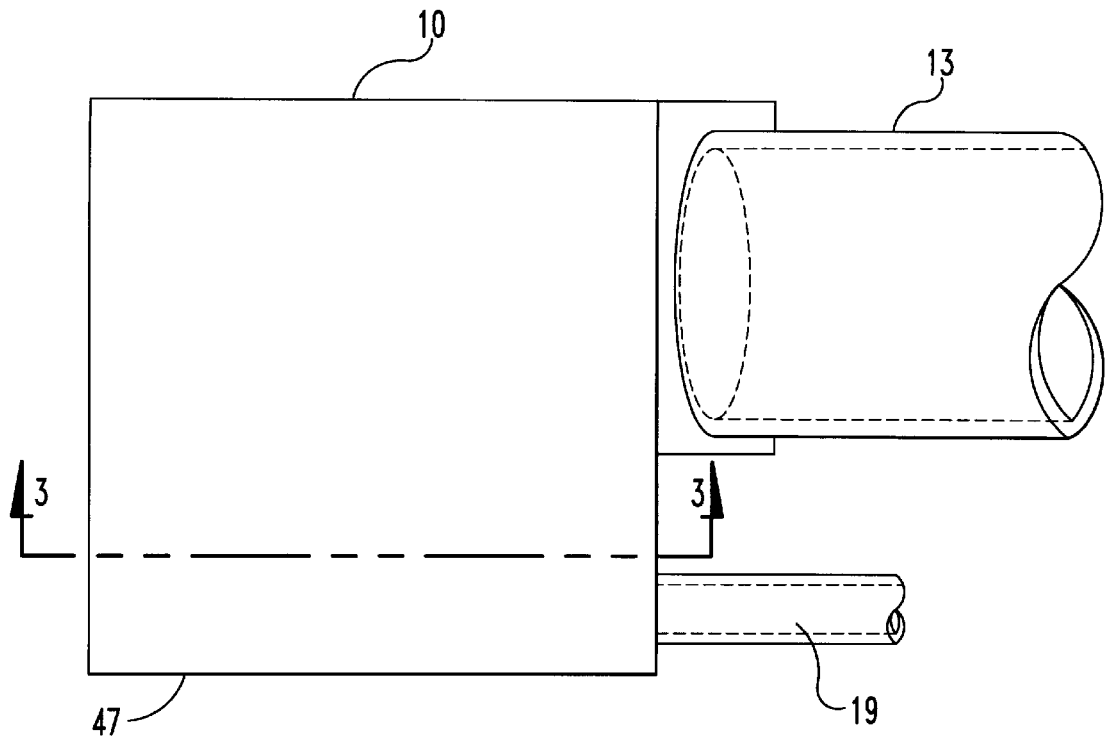
FIG. 2 is a top view.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a bin or receptacle 10 for receiving and holding various foreign materials conveyed into the receptacle by a fluid or air stream introduced via inlet 12. An inlet conduit 13 is connected to inlet 12 and provides a passage for air conveyed materials opening into the inlet. Conduit 13 extends to a remote location whereat the opposite end 14 is connected to the means for initially collecting the material to be conveyed to the receptacle. The foreign material may include shredded paper, fine dust, particles of metal, dust, plastic and other such materials or even may include final product. For example, small candies, fasteners and virtually any type of relatively lightweight material may be conveyed by the stream of air through conduit 13. End 15 of the conduit is connected to inlet 12 of the receptacle.

Air exhauster E is connected to a primary exhaust conduit 16 having a first end 17 opening into conduit 13 between opposite ends 14 and 15. Exhauster E is operable to exhaust or pull it portion of the fluid or air from conduit 13 through a cylindrical screen 23 mounted in conduit 13 and then through end 17 of conduit 16 allowing the remaining portion of fluid or air and the materials being conveyed, due to the forward momentum exerted on the air and particles remaining in conduit 13 by exhauster E, to empty into receptacle 10. The material being conveyed then drops into pile 11 formed at the bottom of the receptacle. A conduit is connected to the outlet of exhauster E and allows the air exhausted from conduit 13 via conduit 16 to escape to the atmosphere. Screen 23 prevents the conveyed material from flowing into conduit 16.

Figure 3:
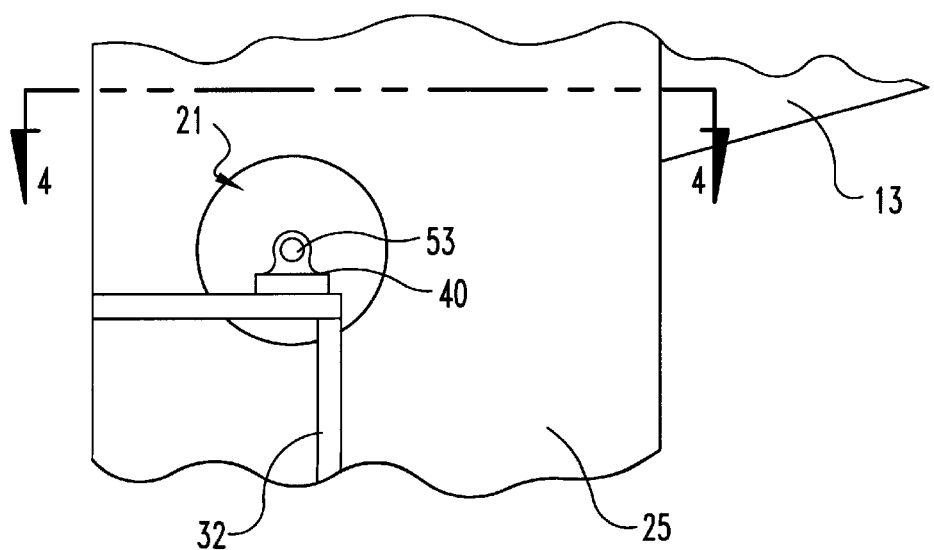
FIG. 3 is a fragmentary cross-sectional view taken along the line 3—3 of FIG. 2 and viewed in the direction of the arrows.
Figure 5:
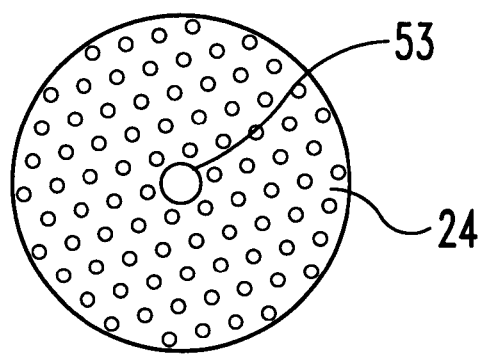
FIG. 5 is a view of the rotating filter looking in the direction of arrows 5—5 of FIG. 4.
Figure 4:
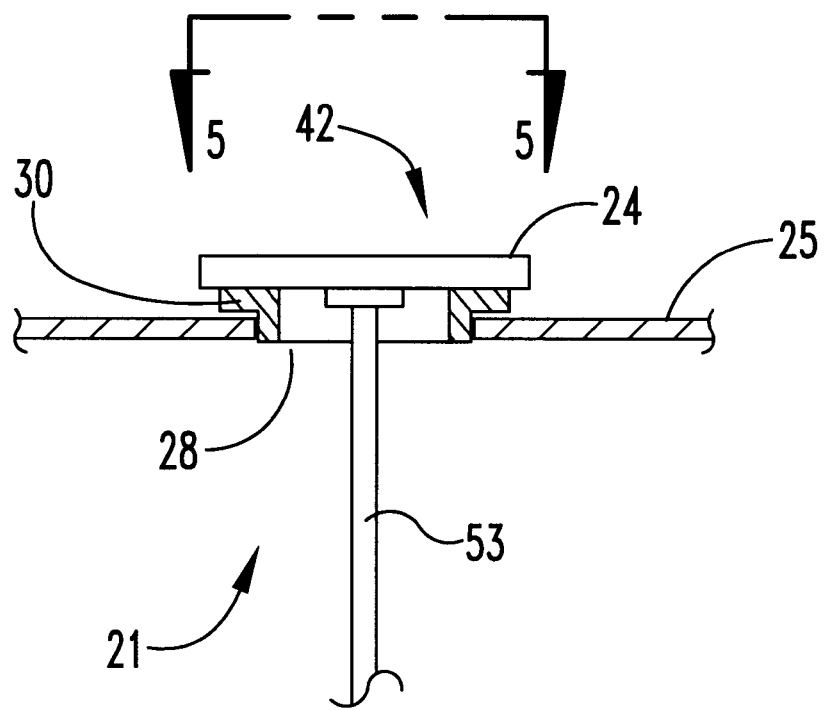
FIG. 4 is a fragmentary cross-sectional view taken along the line 4—4 of FIG. 3 and viewed in the direction of the arrows.

A secondary exhaust conduit 19 is connected to outlet 20 of the receptacle allowing air within the receptacle to exit therefrom. In order to prevent the foreign material carried by the air stream to also exit via outlet 20, a rotating or moving filter 21(FIG. 4) is mounted to the receptacle to deflect materials within the receptacle from exiting via the outlet. The rotating filter consists of a perforated plate or screen 24 mounted to a circular L shaped frame 30 in turn mounted by spokes to a hub having a shaft 53 mounted thereto which extends through bearings 40 mounted to frame 32(FIG. 3) in turn mounted to the receptacle. A belt 41 drivingly engages the end of shaft 53 and in turn is driven by the output shaft of motor 22(FIG. 1) mounted externally or internally with respect to the receptacle 10. In one embodiment, the plane of rotation of plate is parallel to and adjacent to the stream of fluid flowing in the direction of arrow 34(FIG. 1) into the receptacle via inlet 12. A deflector wall 25 surrounds plate 24 and in one embodiment is located immediately behind plate 24 but spaced apart therefrom limiting the flow of foreign material around the circumference of the plate while the air or fluid passes through the plate in the direction of arrow 42(FIG. 4) and into conduit 19.

The location of filter 21 is not contingent upon entry or exit positioning. In the preferred embodiment, the rotating filter is positioned at ninety degrees from the incoming air or fluid stream and at about the same elevation. Thus, air or fluid exiting the receptacle via conduit 19 flows first through plate 24 in the direction of arrow 42(FIG. 4) which is at a right angle to the incoming stream flowing in the direction arrow 34(FIG. 1). In the preferred embodiment, the rotating filter is positioned between inlet conduit 13 and exhaust conduit 19 with the axis of rotation being perpendicular to the incoming stream flowing in the direction of arrow 34.

The rotating plate 24 is positioned adjacent but spaced apart from hole 28 provided in deflector wall 25 mounted to the receptacle. Wall 25 is spaced apart from the exterior side wall 47(FIG. 1) forming a closed compartment 48 having only inlet hole 28 and outlet 20. Thus, the rotating plate 24 is positioned adjacent the bin outlet allowing only flow of air or fluid through hole 28 via plate 24, into compartment 48 and then out via outlet 20 into conduit 19. As the plate is rotated on its axis, the air or fluid within the receptacle passes through the plate while the foreign material is prevented from flowing through the plate by the rotational action thereof. Likewise, the foreign material is prevented from flowing around the plate. Even if the foreign material contacts the plate, the rotational action of the plate and the resulting centrifugal force will throw the foreign material off of the plate and thereby provide a self-cleaning action. In lieu of a plate, a perforated sheet or screen may be utilized to allow the air or fluid to flow therethrough.

In the preferred embodiment shown in the drawings, exhauster E is operable to remove via conduit 16 approximately 80% of the air within conduit 13 with the remaining air conveying the foreign material directly into the receptacle. The remaining 20% of the air of the stream then flows through the rotating filter and out exhaust conduit 19 also connected to the Exhauster E. Thus, the stream of air with foreign material initially flows in the direction of arrow 34 with a portion or majority of the air within the stream then abruptly turning in the direction of arrow 33 into conduit 16. The forward momentum of the foreign material carried in the air stream propels the conveyed material past conduit 16 in the direction of arrow 34 and into the receptacle. Most of the material then drops in the direction of arrow 44 forming a pile 11 with the remaining 20% of the air flowing in the direction of arrow 42 through the rotating plate and out conduit 19 in the direction of arrow 45.

Exhauster E is shown as connected to both the primary and secondary exhaust conduits 16 and 19; however, alternatively, a pair of exhausters may be connected respectively to conduits 16 and 19.

In an alternate embodiment, conduit 16 is not provided. Instead, the total air or fluid volume with the conveyed materials flows into receptacle 10 via conduit 13. The air or fluid is exhausted from the receptacle through the rotating plate 24 and then out of the receptacle via conduit 19 by Exhauster E.

Receptacle 10 along with rotating filter 21 provide a secondary separator stage for separating material conveyed in a fluid stream through a conduit 13. The materials conveyed in the stream and at least a portion of fluid in the stream are received by the receptacle with the rotating filter operable to deflect material downwardly towards the bottom of the receptacle. In the preferred embodiment, the majority of the air or fluid within conduit 13 is exhausted via conduit 16 by exhauster E.

The method of separating the materials conveyed in a stream of air includes the step of exhausting some of the air within the stream prior to the stream with materials flowing into a receptacle. The stream is directed with the conveyed materials into the receptacle with some of the air within the receptacle then being exhausted via a receptacle secondary vent. A perforated plate is rotated to block passage of materials within the receptacle from flowing out through the vent while allowing flow of some of the air within the receptacle through the plate and out the vent. In the preferred embodiment, the plate and vent are positioned adjacent the stream entering the receptacle with the plate being positioned between the vent and the stream.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A material collector comprising:

a bin for receiving and holding materials having an inlet and an exhaust outlet;

an inlet conduit providing a passage for air conveyed materials opening into said inlet;

an exhaust conduit connected to said outlet allowing air within said bin to exit said bin;

air pressure means connected to said inlet conduit and said exhaust conduit and operable to force air through said inlet and into said bin and out via said exhaust conduit; and, a rotating plate mounted to said bin and positioned adjacent to said exhaust outlet to deflect materials within said bin from exiting said bin via said exhaust outlet.

2. The collector of claim 1 and further comprising:

power means connected to said plate operable to rotate said plate creating centrifugal force to throw materials off of said plate.

3. The collector of claim 2 wherein:

said plate has an axis of rotation perpendicular to said air flowing through said inlet.

4. The collector of claim 3 wherein:

said plate is perforated whereby allowing air to flow through said plate while defecting off materials.

5. The collector of claim 4 and further comprising:

deflector means mounted to said bin and extending adjacent said plate blocking passage of flow material around said plate.

6. The collector of claim 5 wherein:

said inlet conduit includes a pre-bin air outlet with said air pressure means operable to remove approximately eighty percent of air within said inlet conduit via said pre-bin air outlet with remaining air within said inlet conduit flowing into said bin and out via said exhaust outlet.

7. A secondary separator stage for separating material conveyed in a fluid stream comprising:

an inlet conduit through which a fluid stream with conveyed materials flows;

a receptacle connected to said conduit and receiving said materials conveyed in said stream and at least a portion of fluid in said stream, said receptacle having an secondary exhaust vent with said portion of fluid exiting said receptacle via said vent; and, a rotating plate mounted in said receptacle to deflect materials in said receptacle from flowing out said vent while allowing said portion of fluid to flow out said vent.

8. The secondary separator stage of claim 7 and further comprising:

an electric motor connected to said plate to rotate said plate.

9. The secondary separator stage of claim 8 wherein:

said receptacle includes a bottom portion located beneath said inlet conduit for catching and holding materials flowing into said receptacle.

10. The secondary separator stage of claim 9 and further comprising:

a primary exhaust vent in said inlet conduit; and, an exhauster connected to said primary exhaust vent to withdraw the majority of fluid within said inlet conduit via said primary exhaust vent while allowing the remaining fluid within said inlet conduit to flow into said receptacle and out said secondary vent.

11. The secondary separator stage of claim 10 wherein:

said exhauster withdraws approximately eighty percent of fluid in said inlet conduit via said primary exhaust vent.

12. The secondary separator stage of claim 10 and further comprising:

a deflector mounted to said receptacle and surrounding said plate limiting flow of materials within said receptacle from flowing around said plate while allowing fluid within said receptacle to flow through said plate.

13. A method of separating materials conveyed in a stream of fluid from the stream and collection of said materials within a receptacle comprising the steps of:

conveying materials in a stream of fluid;

directing said stream with materials into a material collecting receptacle;

exhausting some of said fluid within said receptacle via a receptacle vent; and rotating a plate to deflect materials off said plate to block passage of materials within said receptacle from flowing out of said vent while allowing flow of some of said fluid within said receptacle through said plate and out said vent.

14. The method of claim 13 and further comprising:

further exhausting some of said fluid within said stream prior to said stream flowing into said receptacle.

15. The method of claim 14 wherein:

said further exhausting step removes approximately eighty percent of fluid within said stream.

16. The method of claim 15 and further comprising the step of:

positioning said plate adjacent said stream entering said receptacle and between said vent and said stream.

17. The collector of claim 1 wherein:

said plate is a perforated sheet.

18. The collector of claim 1 wherein:

said plate is a screen.

* * * * *